United States Patent [19]

Pourarian

[11] Patent Number: 5,525,435
[45] Date of Patent: Jun. 11, 1996

[54] HYDROGEN STORAGE MATERIALS

[75] Inventor: Faiz Pourarian, Verona, Pa.

[73] Assignee: Eveready Battery Company, Inc., St. Louis, Mo.

[21] Appl. No.: 272,470

[22] Filed: Jul. 11, 1994

[51] Int. Cl.$^6$ ................................................. H01M 4/38
[52] U.S. Cl. ................................................ 429/218; 420/900
[58] Field of Search ............................. 429/218; 420/900

[56] References Cited

U.S. PATENT DOCUMENTS

| | | | |
|---|---|---|---|
| 4,925,748 | 5/1990 | Ikoma et al. | 429/59 |
| 5,008,164 | 4/1991 | Furukawa et al. | 429/218 |
| 5,242,766 | 9/1993 | Furukawa | 429/218 |

OTHER PUBLICATIONS

Li et al, "Magnetic Properties of New Ternary $R_6$ $Ga_3$ $Fe_{11}$ Compounds", J. Appl. Phys. 67 (9) 1 May 1990 pp. 4841–4843.

Primary Examiner—Prince Willis, Jr.
Assistant Examiner—Carol Chaney
Attorney, Agent, or Firm—Robert W. Welsh

[57] ABSTRACT

A hydrogen storage material for use in various hydrogen absorber devices such as electrochemical cells, hydrogen separator devices, temperature sensors and the like, having the formula:

$$R_{6-x}R'_xT_{11-y}T'_yX_{3-z}X'_z$$

where R and R' are a rare earth metal; T is cobalt; T' is Ni, Fe, Mn or Cr; X is Ga; X' is Al, Si, Sn, Ge, Cr, In or Mo; x is from 0.0 to 3.6; y is from 0.0 to 9.0; and z is from 0 to 2.

15 Claims, 4 Drawing Sheets

HYDROGEN STORAGE MATERIALS

FIELD OF THE INVENTION

The invention relates to a specific class of materials that can absorb and then release hydrogen repeatedly and can be used in various devices such as electrochemical cells, heat pumps, storage devices and the like. The materials have the formula:

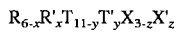

$$R_{6-x}R'_xT_{11-y}T'_yX_{3-z}X'_z$$

where

R is a rare earth element such as lanthanum (La), cerium (Ce), praseodymium (Pr), and neodymium (Nd);

R' is a rare earth element such as erbium (Er) and yttrium (Y);

T is cobalt;

T' is selected from the group consisting of nickel (Ni); iron (Fe), manganese (Mn) and chromium (Cr);

X is gallium (Ga);

X' is selected from the group consisting of aluminum (Al), silicon (Si), tin (Sn), germanium (Ge); copper (Cu); indium (In) and molybdenum (Mo);

x is from 0.0 to 3.6;

y is from 0.0 to 9.0; and z is from 0 to 2.

BACKGROUND OF THE DISCLOSURE

There are many applications which can use materials that can effectively absorb hydrogen and then release hydrogen. These materials can be used to absorb hydrogen in confined spaces and then upon release of the hydrogen from the materials, they can be used again to absorb hydrogen. Applications where hydrogen absorbers can be used are fuel cells, devices for the separation of hydrogen from various gases; isotope separators; heat pumps and refrigerators; heat engines; hydrogen storage devices; temperature sensors and actuators and permanent magnet products. In addition to these applications, good hydrogen storage compounds that can absorb and then release hydrogen can be used in electrochemical cells, such as secondary electrochemical cells. In secondary or rechargeable cells, a negative electrode can be used that is capable of reversibly electrochemically storing hydrogen. These cells generally use a positive electrode made of a nickel hydroxide material along with an alkaline electrolyte. During charging of these cells, the negative electrode material is charged by the electrochemical absorption of hydrogen and the electrochemical evolution of a hydroxyl ion. Upon discharging, the stored hydrogen is released to form a water molecule and evolve an electron which is subsequently used in the charging cycle of the cell. In conventional rechargeable nickel metal hydride cells, the positive electrode upon charging releases water and evolves an electron which is used during discharge to form a hydroxyl ion. Thus a hydrogen storage compound can be used effectively in a rechargeable cell, such as a nickel metal hydride cell.

The prior art on hydrogen storage materials is discussed in detail in U.S. Pat. No. 5,096,667. The following is a recitation of the prior art on hydrogen storage material that is recited in U.S. Pat. No. 5,096,667. One type of a hydrogen storage material is $AB_2$ type hydrogen storage alloys. Early reported members of the $AB_2$ class of hydrogen absorbing material were the binaries $ZrCr_2$, $ZrV_2$, and $ZrMo_2$. These were reported to be thermal hydrogen storage alloys by A. Pebler et al. in "Transactions of the Metallurgical Society", 239, 1593–1600 (1967). Another early member of this class is the Mg-Ni thermal hydrogen storage alloy described by J. J. Reilly et al. in "The Reaction of Hydrogen With Alloys of Magnesium and Nickel and the Formation of $Mg_2NiH_4$" Inorganic Chem. (1968) 7, 2254. F. H. M. Spit, et al. describe a class of ZrNi binary thermal hydrogen storage alloys in "Hydrogen Sorption By The Metallic Glass $Ni_{64}Zr_{36}$ And By Related Crystalline Compounds," Scripta Metallurgical 14, (1980) 1071–1076. This reference describes the thermodynamics of gas phase hydrogen adsorption and desorption in the $ZrNi_2$ binary system. Subsequently, an article by F. H. M. Spit, et al., "Hydrogen Sorption in Amorphous $Ni(Zr,T_1)$ Alloys", Zeitschrift Fur Physikaisch Chemie Neue Folge Bd., 225–232 (1979), reports the gas phase hydrogen sorption and desorption kinetics of thermal hydrogen storage processes in $Zr_{36.3}Ni_{63.7}$ and $Ti_{29}Zr_9Ni_{62}$. Zirconium-manganese binary thermal hydrogen storage alloys were disclosed, for example, by F. Pourarian et al., in "Stability and Magnetism of Hydrides of Nonstoichiometric $ZrMn_2$", J. Phys. Chem. 85, 3105–3111.

Manganese-nickel binary thermal hydrogen storage alloys were described for thermal hydrogen storage in automotive applications by H. Buchner in "Perspectives For Metal Hydride Technology", Prog. Energy Combust. Sci. 6, 331–346. Ternary zirconium, nickel, manganese thermal hydrogen storage alloys are described in, for example, an article by A. Seasick et al., "Thermodynamic Properties of $Zr(Ni_xMn_{1-x})_2$—$H_2$ Systems," Mat. Res. Bull. 19 1559–1571 (1984).

Six component thermal hydrogen storage alloys of the general $AB_2$ type are described in German Patentschrift DE 31-51-712-CI for Titanium Based Hydrogen Storage Alloy With Iron And/or Aluminum Replacing Vanadium and Optionally Nickel. A further teaching relating to multi-component thermal hydrogen storage alloys of this general type is disclosed in German Patentschrift DE 30-23-770-C2 for Titanium Manganese Vanadium Based Laves Phase Material With Hexagonal Structure, Used As Hydrogen Storage Material. The key teaching of this reference is that the nickel in a six component Ti—Zr—Mn—Cr—V—Ni alloy can be partially replaced by Co and/or Cu to give a lower cost thermal hydrogen storage alloy.

Other Laves phase materials are disclosed in U.S. Pat. 4,160,014 for Hydrogen Storage Material. Specifically, an $AB_a$ type thermal hydrogen storage material is disclosed where A is at least 50 atomic percent Ti, balance one or more of Zr or Hf; B is at least 30 atomic percent Mn, balance one or more of Cr, V, Nb, Ta, Mo, Fe, Co, Ni, Cu, and rare earths; and a is from 1.0 to 3.0.

All of the $AB_2$ hydrogen storage alloys described are thermal hydrogen storage alloys. Prior art Laves phase-type electrochemical hydrogen storage alloys are shown, for example, in Laid Open European Patent Application 0-293 660.

Another suitable class of electrochemical hydrogen storage alloys are the Ti—V—Zr—Ni type active materials for use as a negative electrode. These materials are disclosed in U.S. Pat. No. 4,551,400. These materials reversibly form hydrides in order to store hydrogen and have the generic Ti—V—Zr—Ni composition, where at least Ti, V, and Ni are present with at least one or more of Cr, Zr, and Al.

Other Ti—V—Zr—Ni materials may also be used for the rechargeable hydrogen storage negative electrode. One such family of materials are those described in U.S. Pat. No. 4,728,586 for ENHANCED CHARGE RETENTION ELECTROCHEMICAL HYDROGEN STORAGE ALLOYS AND AN ENHANCED CHARGE RETENTION ELECTROCHEMICAL CELL. This patent describes a specific sub-class of the Ti—V—Ni—Zr hydrogen storage alloys comprising titanium, vanadium, zirconium, nickel, and a fifth component, chromium.

An alternative class of hydrogen storage alloys are the $AB_5$ type hydrogen storage alloys. These alloys differ in chemistry, microstructure, and electrochemistry from the $AB_2$ and the V—Ti—Zr—Ni—Cr types of electrochemical hydrogen storage alloys. Rechargeable batteries utilizing $AB_5$ type negative electrodes are described, for example, in U.S. Pat. Nos. 3,874,928, 4,214,043, 4,107,395, 4,107,405, 4,112,199, 4,125,688, 4,214,043, 4,216,274, 4,487,817, 4,605,603, 4,621,034, 4,696,873 and 4,699,856.

U.S. Pat. No. 5,096,667 discloses a reversible, electrochemical cell having a high electrochemical activity, hydrogen storage negative electrode. The negative electrode is formed of a reversible, multicomponent, multiphase, electrochemical hydrogen storage alloy. The hydrogen storage alloy is capable of electrochemically charging and discharging hydrogen in alkaline aqueous media. In one preferred exemplification, the hydrogen storage alloy is a member of the family of hydrogen storage alloys derived from the V—Ti—Zr—Ni and V—Ti—Zr—Ni—Cr alloys in which the V, Ti, Zr, Ni and Cr are partially replaced by one or more modifiers, and the alloy has the composition:

$$(V_{y'-y}Ni_yTi_{x'-x}Zr_xCr_z)_aM_b'M_c''M_d'''M_e^{IV}$$

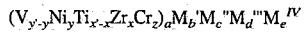

where x' is between 1.8 and 2.2; x is between 0 and 1.5; y' is 1 between 3.6 and 4.4; y is between 0.6 and 3.5; z is between 0.00 and 1.44; a designates that the V—Ni—Ti—Zr—Cr component as a group is from 70 to 100 atomic percent of the alloy, b,c,d,e, . . . , are the coefficients on the modifiers and M', M", $M^{iii}$, and $M^{iv}$ are modifiers which may be individually or collectively up to 30 atomic percent of the total alloy The modifiers M', M", $M^{iii}$, and $M^{iv}$ are chosen from Al, Mn, Mo, Cu, W, Fe, Co, and combinations thereof.

It is an object of the present invention to provide a new class of hydrogen storage compounds that can be used for various applications.

It is another object of the present invention to provide a hydrogen storage compound suitable for use in electrochemical cells, preferably rechargeable electrochemical cells.

It is another object of the invention to provide a hydrogen storage compound ideally suited for use in rechargeable nickel metal hydride cells.

These objects, together with other and further objects of the invention will become fully apparent from the following description.

SUMMARY OF THE INVENTION

The invention relates to hydrogen storage compounds having the formula:

$$R_{6-x}R'_xT_{11-y}T'_yX_{3-z}X'_z$$

where

R is a rare earth element such as lanthanum (La), cerium (Ce), praseodymium (Pr) and neodymium (Nd);

R' is a rare earth element such as erbium (Er); or yttrium (Y);

T is cobalt;

T' is nickel (Ni), iron (Fe), manganese (Mn) or chromium (Cr);

X is gallium (Ga);

X' is selected from the group consisting of aluminum (Al), silicon (Si), tin (Sn), germanium (Ge); copper (Cu); indium (In) and molybdenum (Mo);

x is from 0.0 to 3.6;

y is from 0.0 to 9.0; and z is from 0 to 2.

The preferred rare earth elements for use as the R component are lanthanum, cerium, praseodymium, yttrium and neodymium, with lanthanum and cerium being preferable and lanthanum being the most preferred. The preferred rare earth element for use as the R' component is erbium or yttrium, with erbium being the preferable. The preferred elements of the T' component are nickel, iron, manganese and chromium, with nickel being the most preferred. The preferred elements of X' are aluminum, silicon, tin, germanium, copper, indium and molybdenum, with aluminum being the preferred.

The new compounds of this invention are capable of absorbing hydrogen and then releasing hydrogen so that they are ideally suited for many applications, such as rechargeable electrochemical cells. Examples of suitable hydrogen storage compounds of this invention along with the hydrogen capacity per mole is shown in Table 1. The hydrogen capacity for each compound was determined by the pressure-composition isotherm method measured at room temperature.

TABLE 1

| | Hydrogen Storage Material | $H_2$ Capacity (H/M) |
|---|---|---|
| 1. | $La_6Co_{11}Ga_3$ | 1.10 |
| 2. | $La_3Er_3Co_{11}Ga_3$ | 0.95 |
| 3. | $La_{2.4}Er_{3.6}Co_{11}Ga_3$ | 0.88 |
| 4. | $La_{2.4}Er_{3.6}Co_7Ni_4Ga_3$ | 0.87 |
| 5. | $La_{2.4}Er_{3.6}Co_4Ni_7Ga_3$ | 0.85 |
| 6. | $La_{2.4}Er_{3.6}Co_2Ni_9Ga_3$ | 0.82 |
| 7. | $La_{2.4}Er_{3.6}Co_7Ni_4Ga_2Al$ | 0.91 |
| 8. | $La_{2.4}Er_{3.6}Co_7Ni_4GaAl_2$ | 0.89 |
| 9. | $La_{3.6}Y_{2.4}Co_{11}Ga_3$ | 0.95 |
| 10. | $Ce_6Co_{11}Ga_3$ | 1.0 |
| 11. | $La_2Ce_4Co_{11}Ga_3$ | 0.94 |
| 12. | $Pr_6Co_{11}Ga_3$ | 0.96 |

A Beaker Cell Test Process was used to determine the electrochemical capacities of some of the hydrogen storage compounds. Specifically, the Beaker Cell Test Process for a representative class of compounds of the formula $R_6(Co, Ni)_{11}Ga_3$ was done in the following manner.

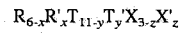

1. Metal hydride (MeH) was hand ground in a dry box atmosphere to a particle size of less than 250 μm with a porcelain mortar/pestle arrangement.

|   | 2. Mix formulation: | (by weight) | |
|---|---|---|---|
| a. | (R,R')$_6$(Ni,Co)$_{11}$Ga$_3$ (<250μ) | 89.0% | 89.0 g |
| b. | Ni 287 Powder | 9.6% | 9.6 g |
| c. | Fibers (Kanecaron) | 0.4% | 0.4 g |
| d. | Hydroxypropyl methylcellulose (HPMC) (Dry) | 1.0% | 1.0% |

3. a, b, and c were dry blended until uniform and added to the HPMC solution in 25% increments; the mix became very stiff and lost its "glossy" surface after 75 percent of the "dry-blend" was added.

4. The mix was gravimetrically embedded onto a perforated Ni-plated carrier.

5. The electrode stock was dried at 350° F. for three minutes using a Grieve drying oven set at 350° F.

Figure 1:
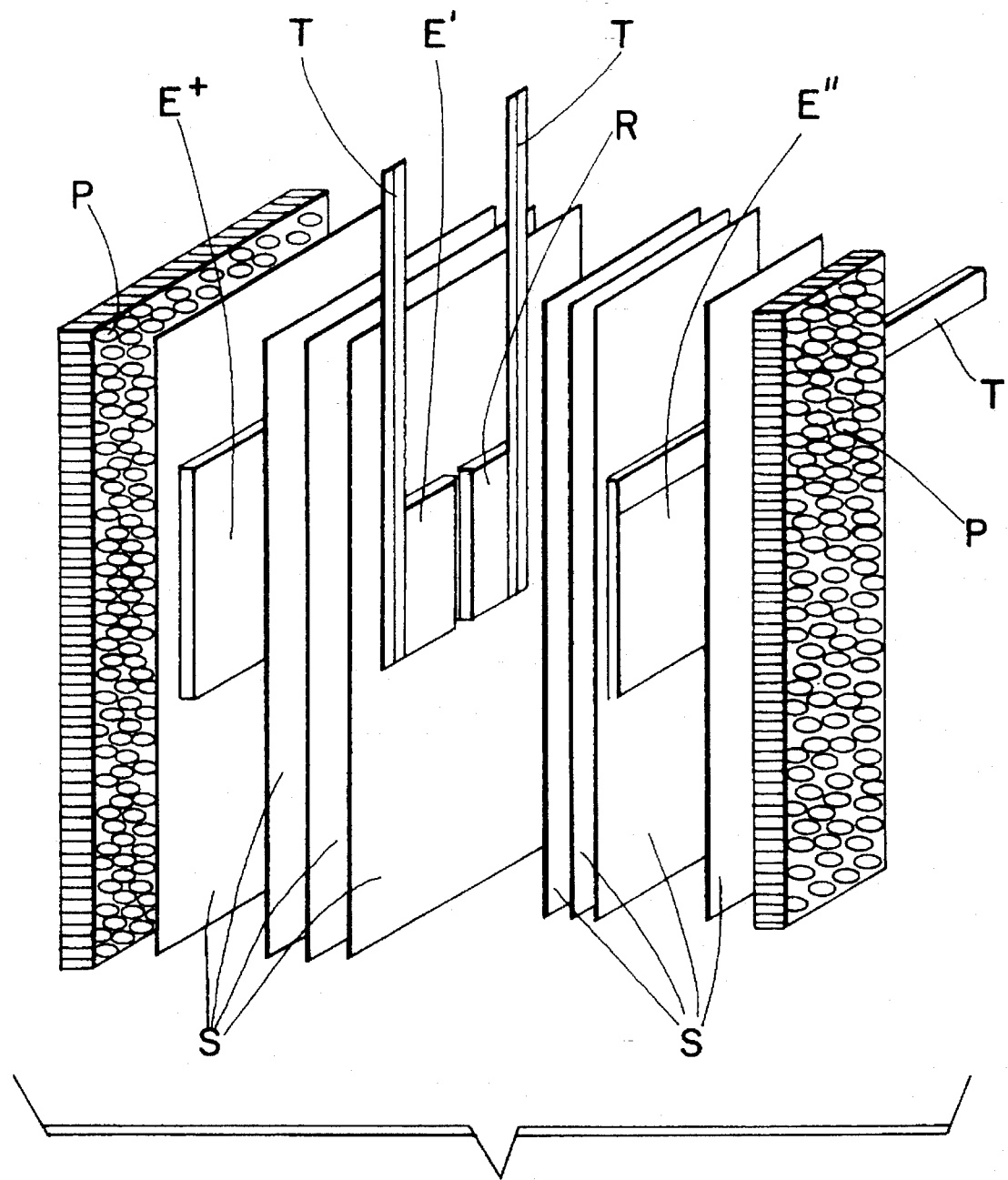
FIG. 1 is an exploded view of a test cell construction for determining the electrochemical capacity of the hydrogen storage compounds of this invention.

6. A test plaque was assembled as shown in FIG. 1:

Components of the test plaque are layered onto one of the polytetrafluorethylene plaques P as shown in FIG. 1. The assembly sequence was as follows:

A perforated polytetrafluorethylene plaque (P) was prepared and then a separator ($S_1$) was placed over one side of the plaque. A positive electrode ($E^+$) was placed over the separator ($S_1$) and then three separators ($S_2$, $S_3$, $S_4$) were placed over the positive electrode. A metal hydride negative electrode (E') was centrally located on the outer surface of the three separators and spaced apart from an encapsulated 20% $H_2/H_2O$ reference R electrode. Three additional separators ($S_5$, $S_6$, $S_7$) were placed over the metal hydride negative electrode and the reference R electrode and then on the opposite side of the separator was placed a positive sintered electrode (E") so that the metal hydride electrode and the positive sintered electrode were aligned on opposite sides of the three separators. A final separator ($S_8$) was placed over the positive electrode and then a second perforated polytetrafluorethylene plaque was placed over the outer separators completing the cell. FIG. 1 shows an exploded view of the components of the test cell. Conductive nickel tabs T were secured to the electrodes as shown in FIG. 1 and all the components were held tightly together by clips (not shown). The electrolyte was a 35% Li-KOH electrolyte solution.

The conditions for testing $La_{2.4}Er_{3.6}Co_2Ni_9Ga_3$ are shown in Table 2.

TABLE 2

| Hydrogen Storage Material | $La_{2.4}Er_{3.6}CO_2Ni_9Ga_3$ |
|---|---|
| MeH electrode: | 0.5 inch × 0.5 inch |
| Mass of MeH: | 0.325 g |
| Cell balance: | 9.98 (+):1 (−) |
| Temperature: | 21° C. (room temperature) |
| Charge Rate: | 15 mA for 4 hours |
| Rest: | 15 min. |
| Discharge Rate: | 25 mA; |
| Discharge Cut-off Voltage: | −0.5 V MeH vs. ref. |

The electrochemical capacity (mAh/g) for some of the hydrogen storage compound samples using the Beaker Cell Test Process are shown in Table 3.

TABLE 3

| Hydrogen Storage Compound | Electrochemical Capacity (mAh/g) |
|---|---|
| $La_{2.4}Er_{3.6}Co_2Ni_9Ga_3$ | 140 |
| $La_6Co_{11}Ga_3$ | 25 |
| $La_{2.4}Er_{3.6}Co_4Ni_7Ga_3$ | 130 |

Figure 2:
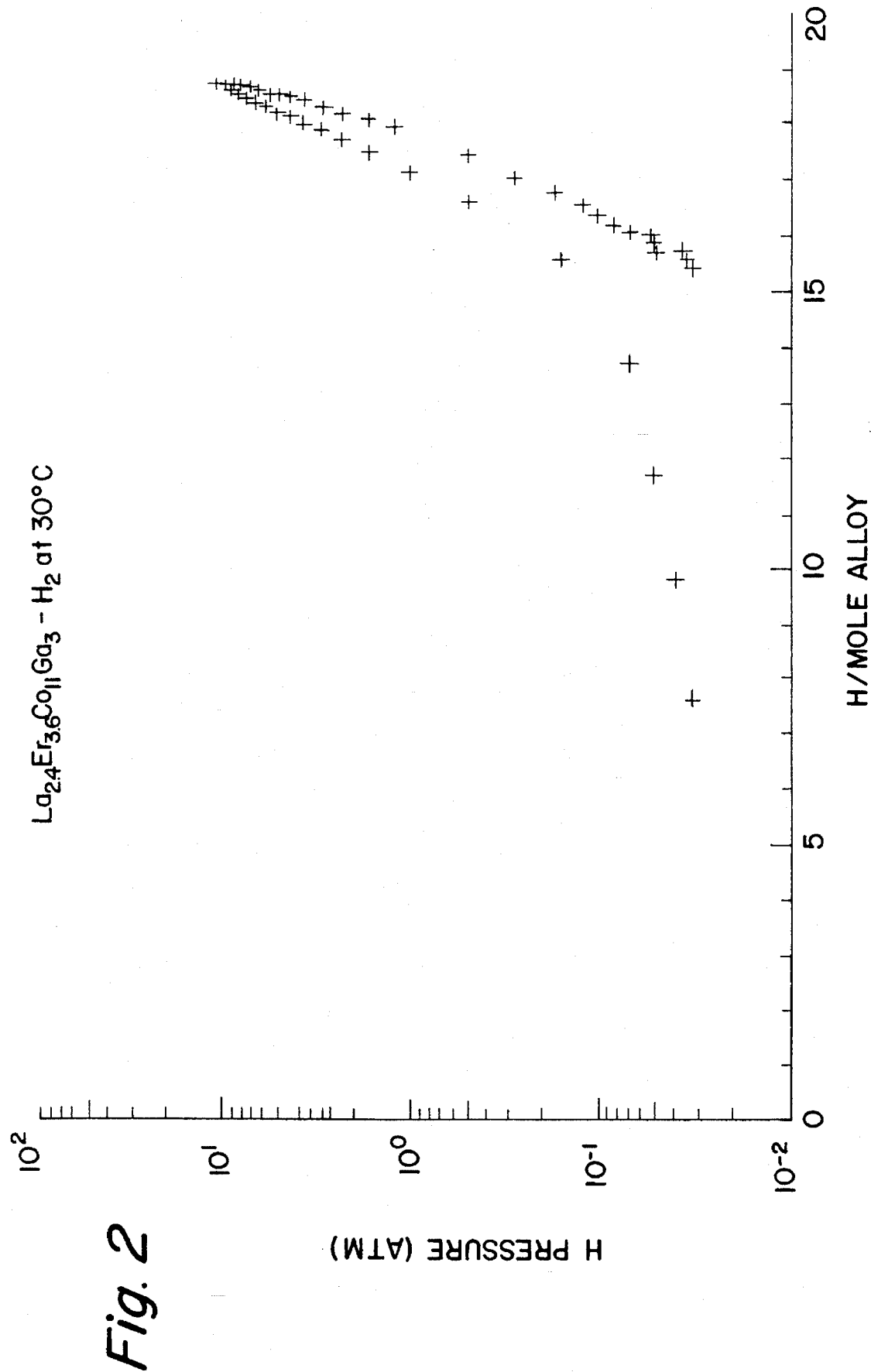
FIG. 2 is a Pressure-Composition Isotherm curve of $La_{2.4}Er_{3.6}Co_{11}Ga_3$—$H_2$ at 30° C., which is representative of a quaternary alloy hydride of the invention.
Figure 3:
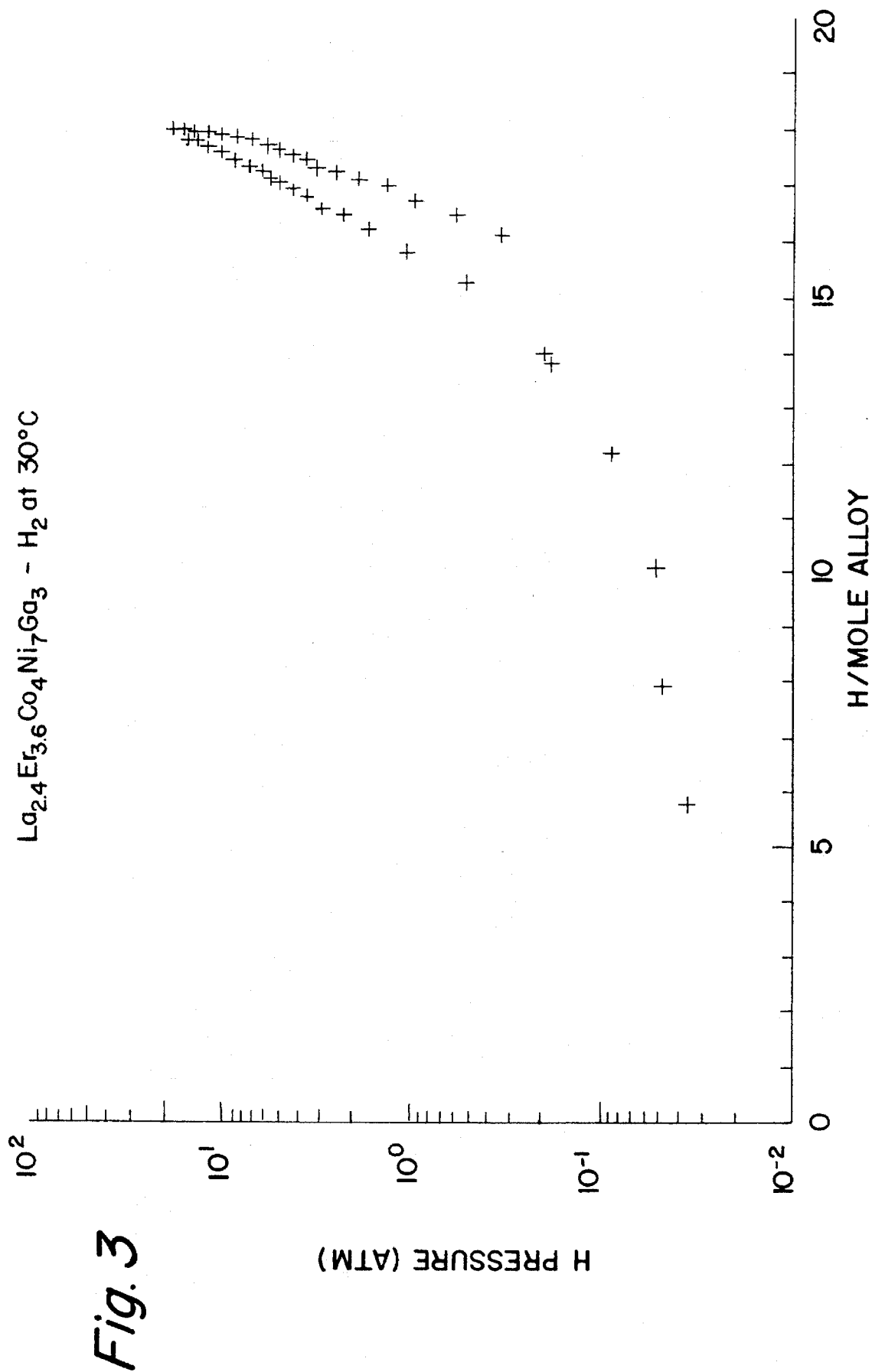
FIG. 3 is a Pressure-Composition Isotherm curve of $La_{2.4}Er_{3.6}Co_4Ni_7Ga_3$—$H_2$ at 30° C., which is representative of a multicomponent alloy hydride of the invention.
Figure 4:
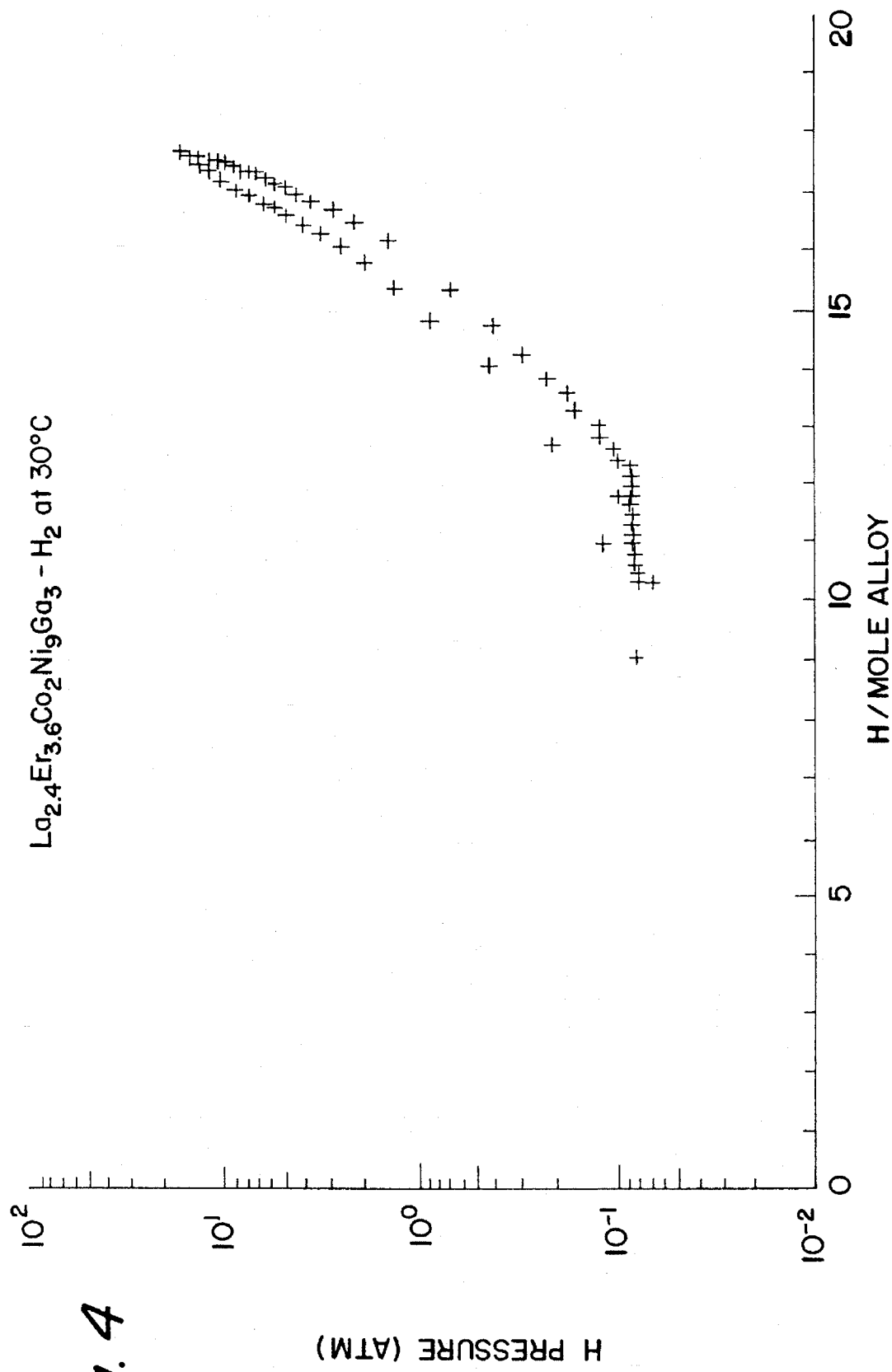
FIG. 4 is a Pressure-Composition Isotherm curve of $La_{2.4}Er_{3.6}Co_2Ni_9Ga_3$—$H_2$ at 30° C., which is representative of a multicomponent alloy hydride of the invention.

The data along with the pressure-composition curves of $La_{2.4}Er_{3.6}Co_{11}Ga_3$ shown in FIG. 2, the pressure-composition curve of $La_{2.4}Er_{3.6}Co_4Ni_7Ga_3$ shown in FIG. 3 and the pressure-composition curve of $La_{2.4}Er_{3.6}Co_2Ni_9Ga_3$ shown in FIG. 4, show that the hydrogen storage compounds of this invention will be ideally suited for use in rechargeable electrochemical cells. It was also found that the compounds of this invention are capable of absorbing and releasing hydrogen over temperature and pressure ranges that are suitable for electrochemical cell applications. The hydrogen storage compounds of this invention can be used in cell systems such as nickel metal hydride cells, and rechargeable cells. When using the hydrogen storage compound as a hydrogen absorber then it can be used in such cell systems as alkaline cell system. Preferably for most cell applications, the hydrogen capacity should be at least greater than 55 H/M and the electrochemical capacity should be at least 25 mAh/g. More preferably, the hydrogen capacity should be 80 H/M or greater and the electrochemical capacity should be 60 mAh/g or greater for most rechargeable cells.

Although the compounds were described as being suitable for use in electrochemical cells, the hydrogen storage compounds can be used in many other applications such as heat pumps, fuel cells, devices for the purification and separation of hydrogen from a mixture of gases, hydrogen storage applications, sensors and actuators, and the like.

It is to be understood that modifications and changes to the preferred embodiment of the invention can be made without departing from the spirit and scope of the invention.

What is claimed is:

1. A hydrogen storage material having the formula:

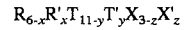

where

R is a rare earth element;

R' is erbium or yttrium;

T is cobalt:

T' is selected from the group consisting of nickel (Ni), iron (Fe), manganese (Mn) and chromium (Cr);

X is gallium (Ga);

X' is selected from the group consisting of aluminum (Al), silicon (Si), tin (Sn), germanium (Ge), copper (Cu), indium (In) and molybdenum (Mo);

x is from 0.0 to 3.6;

y is from 0.0 to 9.0; and z is from 0 to 2.

2. The hydrogen storage material of claim 1 wherein R is selected from the group consisting of lanthanum, cerium, praseodymium and neodymium.

3. A hydrogen storage material having the formula:

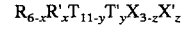

where

R is a rare earth element;

R' is erbium;

T is cobalt;

T' is selected from the group consisting of nickel (Ni), iron (Fe), manganese (Mn) and chromium (Cr);

X is gallium (Ga);

X' is selected from the group consisting of aluminum (Al), silicon (Si), tin (Sn), germanium (Ge), copper (Cu), indium (In) and molybdenum (Mo);

x is from 0.0 to 3.6;

y is from 0.0 to 9.0; and z is from 0 to 2.

4. A hydrogen storage material having the formula:

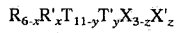

where

R is a rare earth element;

R' is a rare earth element or yttrium;

T is cobalt;

T' is selected from the group consisting of nickel (Ni), iron (Fe), manganese (Mn) and chromium (Cr);

X is gallium (Ga);

X' is selected from the group consisting of aluminum (Al), silicon (Si), tin (Sn), germanium (Ge), copper (Cu), indium (In) and molybdenum (Mo);

x is from 0.0 to 3.6;

y is from 0.0 to 9.0;

z is from 0 to 2; and said hydrogen storage material is selected from the group consisting of $La_{2.4}Er_{3.6}Co_2Ni_9Ga_3$ and $La_{2.4}Er_{3.6}Co_4Ni_7Ga_3$.

5. A hydrogen storage material having the formula:

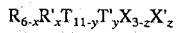

where

R is a rare earth element;

R' is erbium or yttrium;

T is cobalt;

T' is nickel;

X is gallium (Ga);

X' is aluminum;

x is from 0.0 to 3.6;

y is from 0.0 to 9.0; and z is from 0 to 2.

6. An electrochemical cell employing a hydrogen storage material having the formula:

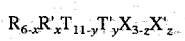

where

R is a rare earth element;

R' is a rare earth element or yttrim (Y);

T is cobalt;

T' is selected from the group consisting of nickel (Ni); iron (Fe), manganese (Mn) and chromium (Cr);

X is gallium (Ga);

X' is selected from the group consisting of aluminum (Al), silicon (Si), tin (Sn), germanium (Ge); copper (Cu); indium (In) and molybdenum (Mo);

x is from 0.0 to 3.6;

y is from 0.0 to 9.0; and z is from 0.0 to 2.

7. The electrochemical cell of claim 6 wherein R is selected from the group consisting of lanthanum, cerium, praseodymium and neodymium.

8. The electrochemical cell of claim 6 wherein the hydrogen storage material is selected from the group consisting of $La_6Co_{11}Ga_3$, $La_3Er_3Co_{11}Ga_3$, $La_{2.4}Er_{3.6}Co_{11}Ga_3$, $La_{2.4}Er_{3.6}Co_7Ni_4Ga_3$, $La_{2.4}Er_{3.6}Co_4Ni_7Ga_3$, $La_{2.4}Er_{3.6}Co_2Ni_9Ga_3$, $La_{2.4}Er_{3.6}Co_7Ni_4Ga_2Al$, $La_{2.4}Er_{3.6}Co_7Ni_4GaAl_2$, $La_{3.6}Y_{2.4}Co_{11}Ga_3$, $Ce_6Co_{11}Ga_3$, $La_2Ce_4Co_{11}Ga_3$ and $Pr_6Co_{11}Ga_3$.

9. The electrochemical cell of claim 8 wherein said hydrogen storage material is selected from the group consisting of $La_{2.4}Er_{3.6}Co_2Ni_9Ga_3$; $La_6Co_{11}Ga_3$; $La_{2.4}Er_{3.6}Co_4Ni_7Ga_3$; $La_3Er_3Co_{11}Ga_3$ and $La_{2.4}Er_{3.6}Co_7Ni_4G_2Al_2$.

10. The electrochemical cell of claim 8 wherein the cell is a nickel metal hydride cell.

11. The electrochemical cell of claim 6 wherein R is selected from the group consisting of lanthanum, cerium, praseodymium and neodymium; wherein R' is erbium or yttrium; T is nickel and X' is aluminum.

12. The electrochemical cell of claim 6 wherein the cell is a nickel metal hydride cell.

13. A hydrogen absorber device using a hydrogen storage material having the formula:

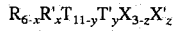

where

R is a rare earth element selected from the group consisting of lanthanum (La), cerium (Ce), praseodymium (Pr) and neodymium (Nd);

R' is a rare earth element erbium (Er) or yttrium;

T is cobalt;

T' is selected from the group consisting of nickel (Ni); iron (Fe), manganese (Mn) and chromium (Cr);

X is gallium (Ga);

X' is selected from the group consisting of aluminum (Al), silicon (Si), tin (Sn), germanium (Ge); copper (Cu); indium (In) and molybdenum (Mo);

x is from 0.0 to 3.6;

y is from 0.0 to 9.0; and z is from 0 to 2.

14. The hydrogen absorber device of claim 13 wherein said hydrogen absorber device is a fuel cell.

15. The hydrogen absorber device of claim 13 wherein said hydrogen absorbed device is a heat pump.

* * * * *